F. H. VARNEY.
HALTER.
APPLICATION FILED FEB. 10, 1910.
964,947.
Patented July 19, 1910.
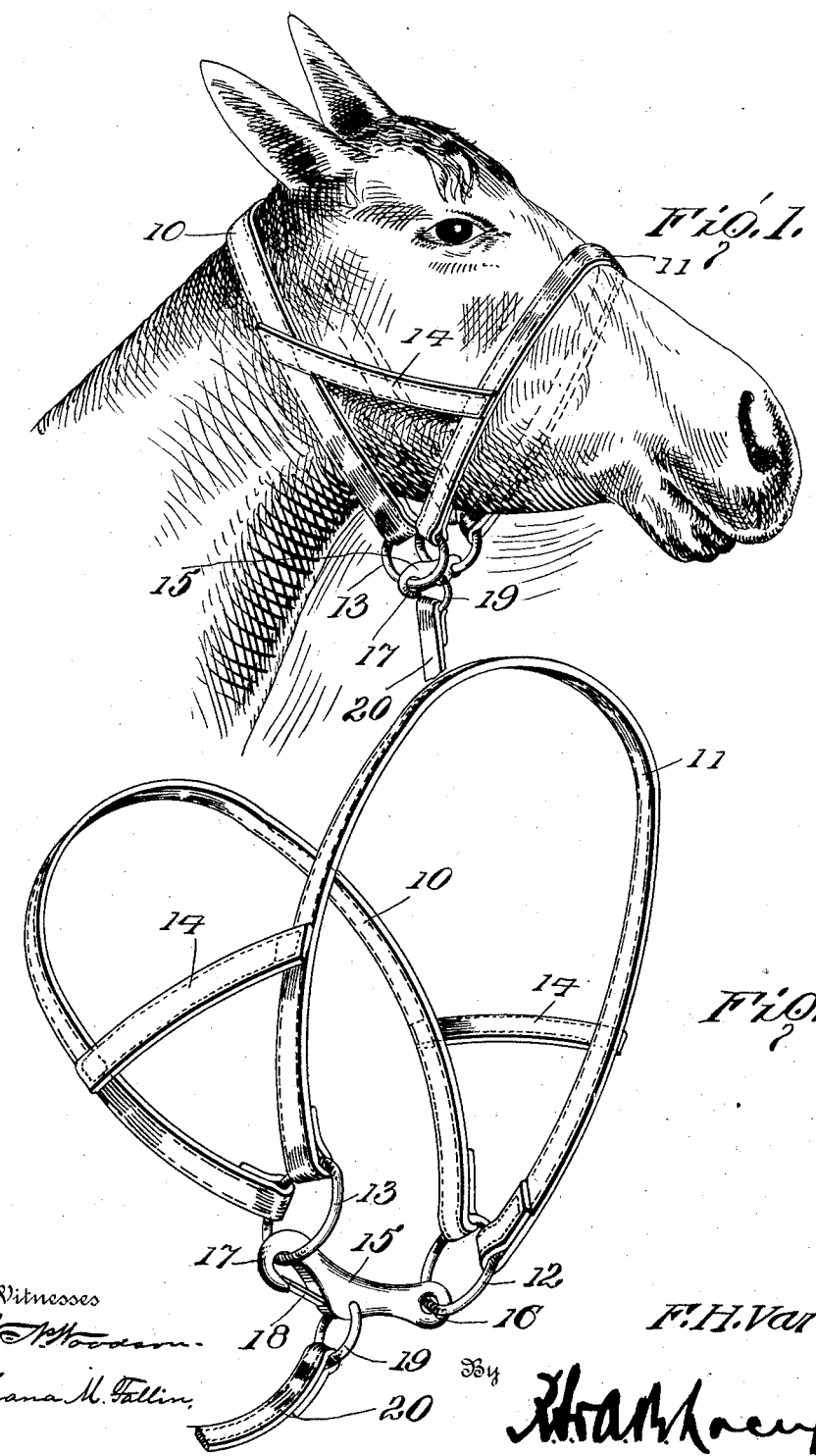

UNITED STATES PATENT OFFICE.

FREDERICK H. VARNEY, OF LYNDONVILLE, VERMONT.

HALTER.

964,947.  Specification of Letters Patent.  Patented July 19, 1910.

Application filed February 10, 1910. Serial No. 543,120.

*To all whom it may concern:*

Be it known that I, FREDERICK H. VARNEY, a citizen of the United States, residing at Lyndonville, in the county of Caledonia and State of Vermont, have invented certain new and useful Improvements in Halters, of which the following is a specification.

This invention relates to harness and refers particularly to that class of devices known as halters.

An object of this invention is to form a halter which may be applied from either side of the head of the animal.

Another object of this invention is to form a halter in which but one fastening is employed and wherein no adjustment is necessary so that the halter may be readily and quickly applied to an animal under practically any circumstances, particularly in the application of the halter to a spirited animal, or to an animal when in the dark where the parts of the halter cannot be seen.

The invention further contemplates the provision of an improved fastener especially adapted to a halter whereby the halter may be quickly attached and detached relative to the animal.

For a full understanding of the invention reference is to be had to the following description and accompanying drawing, in which:—

Figure 1 is a perspective view of the halter as applied to the head of an animal, and Fig. 2 is a detail perspective view of the halter.

Corresponding and like parts are referred to in the following description and indicated in all the views of the accompanying drawing.

Referring to the drawing the numerals 10 and 11 designate a pair of loops which are formed from straps cut to the desired length, and which are secured at their free ends upon rings 12 and 13. The ends of the loops 10 and 11 are overturned and stitched to engage the rings 12 and 13 in order to loosely connect the loops 10 and 11. Cheek-straps 14 are employed for connecting the loops 10 and 11 to each other and to retain the same in predetermined spaced relation. The loops 10 and 11 are of equal length so as to admit of the interchanging of the same upon the neck and the nose of the animal to which the halter is applied.

For the purpose of securing the halter upon the animal the ring 12 is provided with a bar 15 which is formed with an eye 16 at one end through which the ring 12 is engaged, while the opposite end of the bar 15 is tapered and curved inwardly to form a hook 17 which is provided with a leaf-spring 18 carried at the adjacent edge and at the central portion of the bar 15. The leaf-spring 18 extends outwardly and rests against the inner face of the hook 17 to form a snap-hook. A connecting ring 19 is engaged through the central portion of the bar 15 adjacent the inner end of the spring 18 and carries one extremity of a holding strap 20.

As the straps or loops 10 and 11 are of equal lengths the improved halter may be applied to the head of the animal from either side.

In Fig. 1 the halter is disclosed as being secured from the right side of the animal, wherein the loop 10 is engaged over the neck of the animal and the loop 11 about the nose. The cheek-straps 14 serve to retain the loops from falling downwardly over the neck and nose of the animal, while the rings 12 and 13 loosely hold the ends of the loops together.

It will be noted that the snaphook 17 is located in the right side or near side in this instance, and that the holding-strap 20 is secured to the bar 15 and remains in fixed connection to the halter after the same has been detached from the head of the animal.

To detach the halter, all that is necessary is to disengage the ring 13 from the snaphook 17 and to throw the released ends of the loops 10 and 11 over the head of the animal.

Having thus described the invention what is claimed as new is:—

A halter comprising a pair of loops of equal length, cheek straps arranged across the loops to hold the same in predetermined spaced relation, rings connecting the opposite ends of the loops, a bar permanently carried by one of the rings for detachable engagement with the opposite of the rings to retain the rings in spaced relation, and a holding strap permanently attached to the central portion of said bar.

In testimony whereof I affix my signature in presence of two witnesses.

FRED. H. VARNEY. [L. S.]

Witnesses:
J. B. RIPLEY,
C. L. STUART.